United States Patent [19]

Le Vantine et al.

[11] 3,824,951

[45] July 23, 1974

[54] FINGERPRINTING MACHINE

[76] Inventors: Allan D. Le Vantine, 18225 Rancho St., Tarzana, Calif. 91356; Daniel L. Curtis, 1956 Ardmore Ave., Manhattan Beach, Calif. 90266

[22] Filed: Dec. 17, 1973

[21] Appl. No.: 425,287

[52] U.S. Cl. .................. 118/31.5, 118/240, 118/253

[51] Int. Cl. .................. A61b 5/10

[58] Field of Search .......... 118/31.5, 253, 242, 232, 118/240; 117/.5, 1, 1.5

[56] References Cited

UNITED STATES PATENTS

| | | | |
|---|---|---|---|
| 1,676,020 | 7/1928 | Glass | 118/31.5 |
| 2,782,543 | 2/1957 | Soto | 118/31.5 |
| 3,083,682 | 4/1963 | Brutten et al. | 118/31.5 |
| 3,448,723 | 6/1969 | Antles | 118/503 |
| 3,675,618 | 7/1972 | Lezok | 118/31.5 |
| 3,694,240 | 9/1972 | Miller et al. | 118/31.5 X |

FOREIGN PATENTS OR APPLICATIONS

| | | | |
|---|---|---|---|
| 30,013 | 12/1909 | Great Britain | 118/31.5 |

*Primary Examiner*—Morris Kaplan
*Attorney, Agent, or Firm*—Ronald W. Reagin

[57] ABSTRACT

Apparatus for taking fingerprint impressions onto a fingerprint card is disclosed which includes a platen and means for retaining a fingerprint card on the platen. Drive means are provided for engaging the platen with the surface of a finger whose fingerprint is to be impressed upon the fingerprint card and for moving the platen in a path such that the platen contacts all portions of the surface of the finger which are to be impressed upon the fingerprint card and there is no slippage between the surface of the finger and the platen.

10 Claims, 7 Drawing Figures

FINGERPRINTING MACHINE

This invention relates to the taking of fingerprint impressions, and more particularly to an improved apparatus for automatically taking such fingerprint impressions.

As is well known, fingerprinting is an art which has been in use for a very long time in the identification of individuals, particularly in police work. Fingerprint impressions are usually taken manually by a trained operator. In the usual process, ink is first applied to a flat plate, usually with a roller, and the finger for which an impression is desired is then placed on the inked plate and rolled to coat the fleshy tip portion of the finger with ink. The finger is then placed on its side upon a card which has a desired arrangement of places for recording prints from each finger. The inked finger is then rolled carefully in a single movement upon the card to record a two-dimensional print thereon.

Owing to the nature of the joints involved in the fingers and arm, the entire forearm, wrist and hand must all be rolled in order to roll the finger in this manner. This presents some difficulty, since such a rolling movement is an unnatural and awkward one, and frequently the print placed upon the card is blurred and inaccurate as a result of the finger having moved laterally even slightly upon the card instead of rolling perfectly across the surface of the card. Further, as other fingers on the hand are inked and their prints recorded upon the card, other problems develop, since each finger in turn becomes coated with ink which is not removed before another finger is printed. Consequently, the rolling movement of the subsequent fingers frequently bring a part of some of the previous fingers into contact with the card, thereby placing numerous smudges upon the card which cannot afterwards be removed.

The above described manual process of obtaining fingerprint impressions is obviously slow and tedious, and can result in a significant bottleneck at a police station or the like if there are a significant number of persons whose fingerprints must be taken. Further, in order to obtain high quality fingerprint impressions, it is necessary that the person taking the prints be a skilled, trained technician in the art, and if such a person is not available at a particular time to take the fingerprint impressions, either the fingerprinting must be postponed until a later time when the technician is available, or there is a high probability that the prints taken by an available but unskilled person will be unusuable because of blurring, smudges or the like.

Because of the above described difficulties, numerous attempts have been made to construct some form of automatic fingerprinting apparatus for obtaining fingerprint impressions. See, for example, U.S. Pat. Nos. 2,782,543; 3,448,723 and 3,675,618, which disclose various fingerprinting apparatus. Such apparatus usually include a platen which supports the fingerprinting card upon which the impression is to be taken and some means for firmly holding the finger whose print is to be impressed upon the card. The platen holding the fingerprint card is then rotated in some manner about the finger to provide the desired fingerprint impression. However, those skilled in the art quickly discovered that the platen could not merely be rotated about the axis of the finger, which would appear to be the obvious way to obtain the desired result, since, if this is done, the same part of the platen and the fingerprint card is always in contact with the finger being printed, and the result is merely an ink spot instead of the desired fingerprint impression. To overcome this defect, various prior art apparatus has proposed that the platen be rotated about axes other than the axis of the finger, and probably the most successful prior art apparatus has provided means for rotating the platen about an axis on the opposite side of the fingerprint card from the finger being printed. While this does reduce the tendency to smear, it is still an unsatisfactory solution to the problem, since the compliance of most fingers is still insufficient to overcome the definite slippage between the surface of the finger and the surface of the platen.

It is accordingly an object of the present invention to provide an apparatus for automatically taking fingerprint impressions.

It is another object of the present invention to provide an improved apparatus for automatically taking fingerprints which can be operated by persons other than highly trained, skilled technicians.

It is yet another object of the present invention to provide an improved apparatus for automatically taking fingerprint impressions which consistently takes high quality, non-blurred impressions, regardless of whether or not the operator is particularly skilled or whether or not the subject being fingerprinted is cooperative.

Briefly stated, and in accordance with the presently preferred embodiment of the invention, apparatus for taking fingerprint impressions onto a fingerprint card is provided which includes a platen for supporting and retaining the fingerprint cards. Drive means are provided for engaging the platen with the surface of the finger whose print is to be impressed upon the card and for moving the platen in a path such that the platen contacts all portions of the surface of the finger which are to be impressed upon the card, while having no slippage between the surface of the finger and the platen. The apparatus includes means for holding the finger in a fixed predetermined position in which the surface of the finger approximately conforms to an imaginary cylindrical surface and the drive means includes means for moving the platen in an epicyclical path about the imaginary cylindrical surface.

In the preferred embodiment of the invention, the drive means includes a circular member which is coaxial with and equal in diameter to the imaginary cylindrical surface and further includes means for rolling the platen around the perimeter of the circular member with no slippage between the perimeter of the circular member and the platen. Preferably, the circular member is a toothed gear member and the platen includes a mating rack which engages the teeth of the gear member to provide the desired rolling motion without any slippage between the platen and the circular member.

For a complete understanding of the invention, together with an appreciation of its other objects and advantages, please refer to the following detailed description of the attached drawings, in which.

Figure 1:
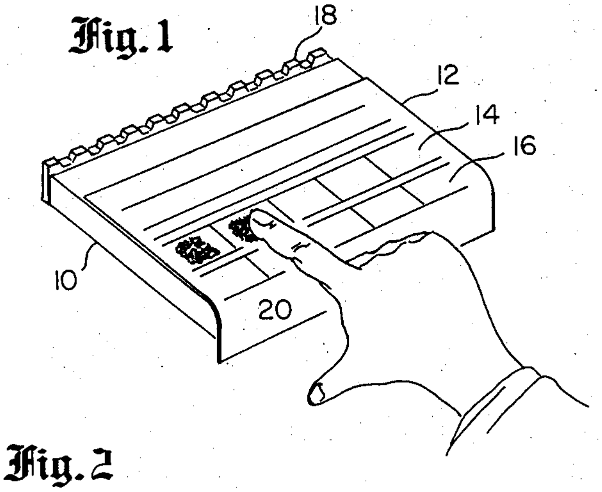
FIG. 1 is a perspective view of a hand to be fingerprinted, and shows the fingerprint card and a platen supporting the card.
Figure 2:
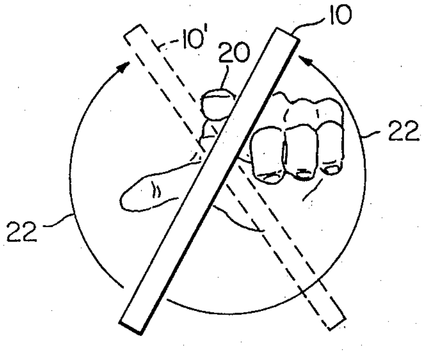
FIG. 2 is an end view of FIG. 1, and shows how, in accordance with the present invention, the platen is moved relative to the finger to provide non-smudged fingerprint impressions.

FIGS. 1 and 2 are perspective views of a hand which is having a fingerprint impression taken of its index finger and illustrates the manner in which the present invention operates to obtain such fingerprint impressions without the likelihood that the impressions will be smeared or in any way disfigured. As is shown in FIGS. 1 and 2, a platen 10 is provided which has secured thereto a fingerprint card 12 of a conventional type. Conventionally, the card 12 includes a first row of five boxes 14 and a second row of five boxes 16. Conventionally, the fingerprint impressions from the right hand are placed in the boxes in the row 14 and the fingerprint impressions from the left hand are placed in the boxes in the row 16.

The platen 10 also includes a gear rack 18 along the top surface of its back edge. The function of gear rack 18 is explained in connection with the description of FIGS. 3A, 3B and 3C below.

Continuing now the description of FIGS. 1 and 2, suitable means are provided for holding the finger 20 in a fixed predetermined position. For clarity, no such means are shown in FIGS. 1 and 2, but a suitable means is shown in detail in FIGS. 4 and 5, discussed below. The surface of the finger 20 is inked in any suitable manner, either before or after it is placed in position, and the platen 10 is brought into position such that the finger 20 comes into contact with the appropriate box in either the row 14 or the row 16 of boxes on card 12. The platen 20 is then "rolled" around the finger in such a manner that the appropriate box on the card 12 contacts all portions of the surface of the finger 20 which are to be impressed upon the card 12 and there is no slippage between the surface of the finger 20 and the card 12 or the platen 10. This rolling motion is suggested in FIG. 2 by the arrows 22 and the broken lines 10', which represent the extreme clockwise position of the motion of the platen 10.

The nature of the path through which the platen 10 traverses in rolling the fingerprint impression may be better understood by considering the outer surface of the finger 20 to be approximately conforming to an imaginary cylindrical surface of predetermined diameter. The platen 10 is then driven in such a manner that it "rolls" around this imaginary cylindrical surface without any slippage between the imaginary cylindrical surface and the platen 10. As far as applicants are aware, there is no technical or mathematical term which describes the path through which a plane such as the platen 10 traverses when it is so rolled without slippage around a cylindrical or circular surface. The nearest mathematical term to this type of motion known to applicants is an epicycloid, which is the curve which is traced by the point on the circumference of a circle as that circle rolls around the outside of the circumference of another circle. Thus, by analogy, applicants have chosen to call the path traversed by the platen 10 when it is so rolled around a circular or cylindrical surface to be an epicyclical path, and whenever the term "epicyclical path" is used herein, it means the path so traversed by the platen 10 whenever it is rolled without any slippage around a cylindrical surface or around the perimeter of a circular member.

Figure 3B:
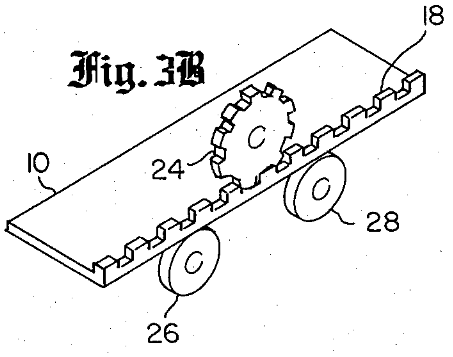
FIGS. 3A, 3B and 3C are sequential schematic perspective views of apparatus in accordance with the present invention, and illustrate how the desired drive is imparted to the platen member.
Figure 3A:
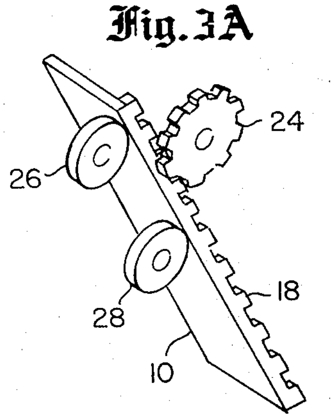
Figure 3C:
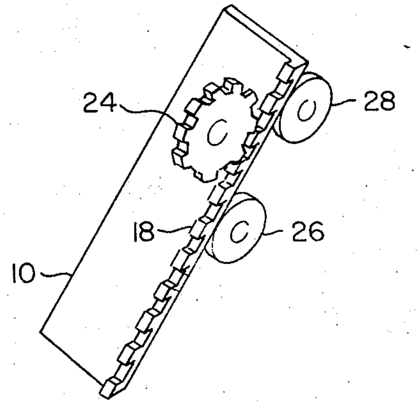

FIGS. 3A, 3B and 3C are successive sequential views of a schematic nature which illustrate the preferred manner in which the platen 10 is driven through an epicyclical path to provide the desired motion illustrated in FIGS. 1 and 2 above. As is shown in FIGS. 3A, 3B and 3C, a circular geared member 24 is provided whose diameter is equal to the diameter of the above-discussed imaginary cylindrical surface in which the finger to be printed is positioned. The circular gear member 24 is positioned so that its axis is aligned with the axis of the imaginary cylindrical surface, or the axis of the finger being printed.

The platen 10 is positioned so that its rack 18 is engaged with the gears of gear member 24, as is shown in the Figures. A pair of rollers 26 and 28 are provided which support the platen 10 on its side beneath the rack 18. The rollers 26 and 28 are positioned in opposed, symmetrical positions relative to the gear member 24, and together with the gear member 24 form a three point suspension system for the platen 10. The rollers 26 and 28 are mounted for rotation about the axis of gear member 24. No means for so mounting the rollers 26 and 28 are shown in these Figures. but a suitable means for so doing are shown in FIGS. 4 and 5 described below.

FIGS. 3A, 3B, and 3C are successive sequential views of the manner in which platen 10 is driven as the rollers 26 and 28 are rotated in a counter-clockwise manner about the axis of gear member 24. As is shown in these views, the rotation of the rollers or platen support members 26 and 28 in a counter-clockwise manner about the axis of gear member 24 causes the platen 10 to be driven in such a manner that it moves in an epicyclical path about the imaginary cylindrical surface discussed above, and if a finger is positioned in approximate confirmation with that imaginary cylindrical surface, the platen, or a fingerprint card carried by the platen, contacts all portions of the surface of the finger, and there is no slippage between the surface of the finger and the platen. To the extent that the surface of the finger is not a pure cylindrical surface, the pliability of the flesh on the finger is sufficient to remain in secure contact with the surface of the platen at all times without any relative slippage between the surface of the finger and the surface of the platen.

Figure 4:
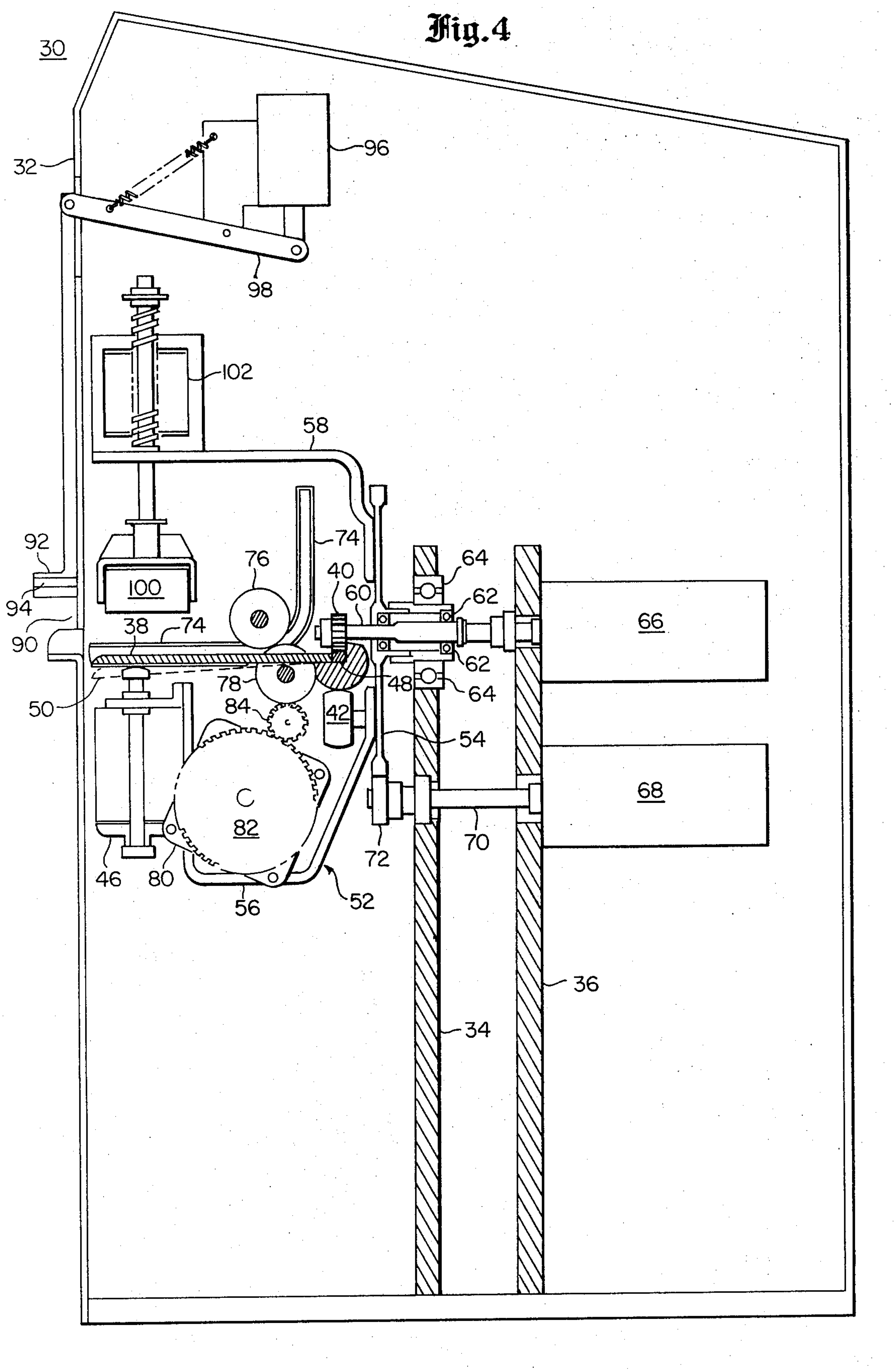
FIG. 4 is a cross-sectional view of an automatic fingerprinting machine in accordance with the present invention which embodies the principles of FIGS. 3A, 3B and 3C.
Figure 5:
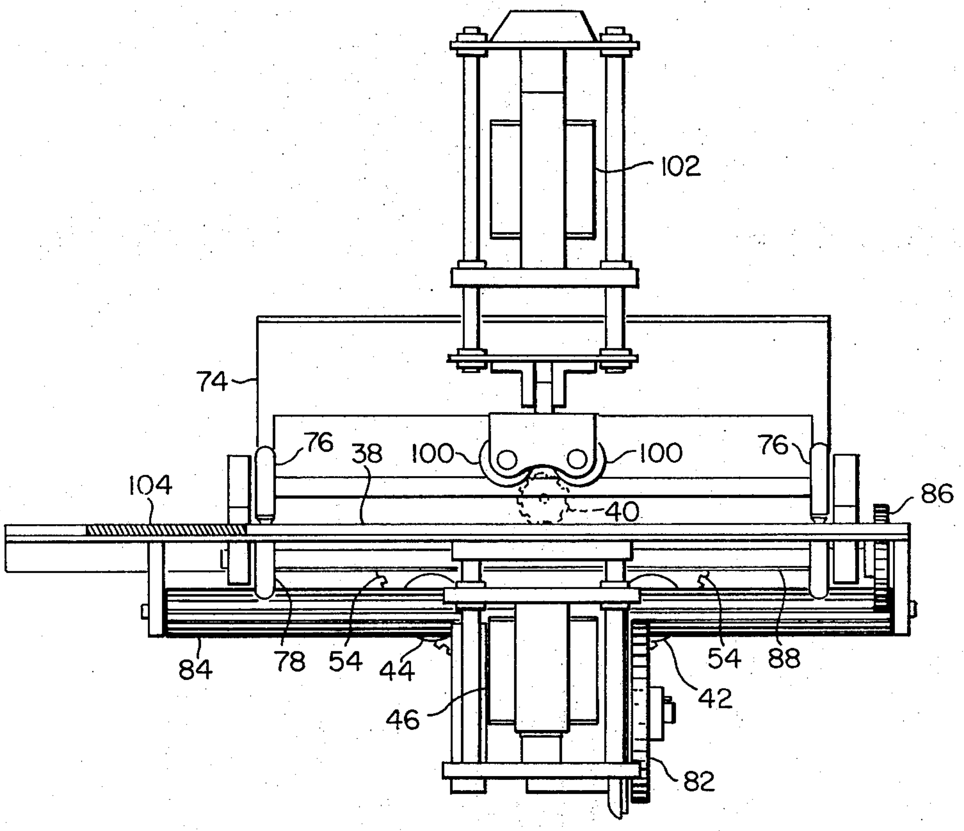
FIG. 5 is a front view of a portion of the apparatus of FIG. 4.

FIG. 4 is a cross-sectional view of an automatic fingerprinting machine 30 in accordance with the present invention and FIG. 5 is a front view of FIG. 4. The following description is essentially of FIGS. 4 and 5 simultaneously, in which the same part or component is identified by the same reference numeral.

The apparatus 30 includes a housing 32 which encloses the apparatus and first and second fixed support members 34 and 36 respectively. Except for the finger holding mechanism, which is described below, all operating portions of the mechanism 30 are supported from either the first fixed support member 34 or the second fixed support member 36.

The apparatus 30 includes a platen 38 which is supported in a "floating" manner within the housing 32 by a three point suspension system comprising a circular gear member 40 and two platen support rollers 42 and 44, together with the top of the plunger of a platen solenoid 46. Thus, the circular gear member 40 is the equivalent of the circular gear member 24 and the platen support rollers 42 and 44 are the equivalent of the rollers 26 and 28 of FIGS. 3A, 3B and 3C. The platen 38 includes a rack section 48 whose teeth are in engagement with the teeth of the circular gear member 40.

For the reasons described in detail below, when the apparatus 30 is operating, the platen solenoid 46 is energized and the platen 38 is in the position shown in FIG. 4. When the solenoid 46 is deenergized, the platen 38 drops to the position shown by the broken lines 50.

The platen support rollers 42 and 44 and the platen solenoid 46 are secured to a rotatable support member 52 which comprises a circular drive gear 54 which includes suitable drive teeth around its outer perimeter, a lower support arm 56 and an upper support arm 58, both of which are secured to the circular drive gear 54.

Circular gear member 40 is positioned on a shaft 60. Shaft 60 and circular drive gear 54 are coaxially mounted for rotation upon first fixed support member 34 by the bearing systems 62 and 64. By this arrangement, when it is desired to do so, as is discussed below, either of the gears 40 or 54 may be driven in rotation while the other of the gears is held stationary. When it is desired to rotate the gear 40, the motor 66, which is supported by the second fixed support member 36, is energized, thereby driving the shaft 60 and the circular gear member 40. When it is desired to rotate the drive gear 54, the motor 68, which is also supported from the second fixed support member 36, is energized, thereby driving the shaft 70 and the drive gear 72 on shaft 70, whose teeth engage the teeth around the outer perimeter of the drive gear 54. Both of the motors 66 and 68 are the types such that, when they are not energized, they are brakes, and thus these motors hold the gears 40 and 54 firmly and rigidly, preventing rotation of these members when the motors are not energized to drive the members.

Let us next consider the manner in which the fingerprint card is supported on the platen 38. A card guide chute 74 is provided in which the fingerprint card is positioned. The card is held in proper alignment by the card drive rollers 76 and 78. When it is desired to move the fingerprint card into or out of the apparatus 30, or to shift the position of the fingerprint card within the apparatus 30; for instance (with reference to FIG. 1) to shift the location of the card so that the row 16 of boxes is brought into alignment instead of the row 14 of boxes, the card drive motor 80, which is mounted on the lower support arm 56 of the rotatable support member 52, is energized. When this occurs, gear 82 is driven, which in turn drives the card drive pinion shaft 84. This shaft drives the gear 86, which is mounted on the same shaft 88 as is card drive rollers 78. Thus, when the motor 80 is energized, the fingerprint card is either drawn further into or is expelled out of the card guide chute 74, depending upon the direction of rotation of motor 80.

It will be appreciated from FIG. 5, that, because card drive pinion shaft 84 is such an elongated member, the platen 38 and all of the parts attached to it can be translated or moved horizontally backwards and forward while still remaining in a driven relation with the gear 82 and the motor 80, which are mounted in a fixed position, at least when the motor 68 is not energized to drive the rotatable support member 52.

Let us next consider the manner in which the finger is supported by the apparatus 30 while the fingerprint is being impressed on a fingerprint card within the machine. The housing 32 includes an aperture or opening 90 into which the finger is inserted. At this time, a finger clamp 92 is lowered and held against the finger with sufficient pressure to hold the finger firmly, but not painfully. If desired, a rubber pad 94 or the like can be provided on the surface of the finger clamp 92 which is actually in contact with the finger. The finger clamp 92 is driven by solenoid 96 and lever 98, which lower and raise finger clamp 92 as solenoid 96 is energized and deenergized, respectively. As was noted above, the strength of solenoid 96 is sufficient to hold the finger firmly but not painfully.

When the finger is inserted through the aperture 90 and is firmly held by the finger clamp 92, the fleshy tip portion of the finger, which of course, is the portion from which the fingerprint impression is taken, is held securely against platen 38 by a pair of finger-holding rollers 100, which are in turn supported from the armature of a solenoid 102. Solenoid 102 is supported from the upper arm 58 of rotatable support member 52. Again, the strength of solenoid 102 is selected so that the finger-holding rollers 100 press firmly but not painfully against the side of the finger opposed to platen 38.

Having now described the components of the apparatus 30, it is now appropriate to consider the manner in which the apparatus opperates to take fingerprint impressions. First, as was described in more detail above, a fingerprint card is inserted into the card guide chute 74, and the card drive motor 80 is energized to position the card properly on platen 38 to receive its first row of fingerprint impressions thereon. The solenoid 46 is deenergized and the platen 38 is in its lower position shown by the broken lines 50 of FIG. 4. The finger to be printed is then inserted through aperture 90 and the solenoid 96 is energized to activate finger clamp 92 to hold the finger in a fixed predetermined position in which the surface of the finger approximately conforms to an imaginary cylindrical surface.

At this point, the finger is inked by the apparatus 30. Of course, if desired, inking could have occurred outside of the apparatus 30, but in the preferred embodiment described herein, the platen 38 is provided with an inking pad section 104 at one end thereof. In this embodiment, with the finger being held by finger clamp 92, and with the solenoid 46 deenergized and the platen 38 and fingerprint card out of contact with the surface of the finger, the motor 66 is energized to drive the circular gear member 40, which drives platen 38 through rack 48 until the platen 38 translates or moves horizontally (to the right in FIG. 5) until the inking pad section 104 is positioned directly under the finger. At this time, motor 66 is deenergized, which thereafter serves as a brake on circular gear member 40, and solenoid 46 is energized to raise the platen 38 to bring the inking pad section 104 into contact with the skin or surface of the finger. Solenoid 102 is energized to bring rollers 100 into contact with the finger, pressing it against inking pad section 104 of platen 38. Motor 68 is then energized to cause the rotatable support member 52 to rotate. When this occurs, the platen support rollers 42 and 44 drive the platen 38 and its rack 48 around the surface of circular gear member 40, thereby causing the platen 38 to move in an epicyclical path around the imaginary cylindrical surface, and around the finger, in such a manner that there is no slippage between the imaginary cylindrical surface or finger and the platen. Since the inking pad section 104 of the platen is now in contact with the finger, the finger is thus coated with a film of ink. Motor 68 is then deenergized and solenoid 46 is deenergized, again dropping platen 38 to its lower, or out of contact with the finger position. Motor 66 is then energized to rotate circular gear member 40 and to drive or translate the platen 38 until the desired portion of the fingerprint card is positioned under the particular finger which is in the apparatus 30 at this time.

At this time, the motor 66 is again deenergized, the solenoid 46 is energized to bring the platen and fingerprint card up into contact with the finger, solenoid 102 is energized to cause rollers 100 to press the finger against the fingerprint card on platen 38 and the motor 68 is energized to drive the platen through an epicyclical path, again as described in FIGS. 3A, 3B and 3C above. When this occurs, the fingerprint card is "rolled" about the inked finger, with no slippage between the finger and the card, and a firm, sharp fingerprint impression is obtained on the desired location of the card. Solenoids 46, 96 and 102 are now deenergized, and the finger is removed from the apparatus 30. Thereafter, prints are sequentially taken from all of the fingers of that hand, and the operation described above is repeated until a complete set of fingerprint impressions for that hand is obtained. Card drive motor 80 is then again energized to shift the position of the fingerprint card to bring the next row of fingerprint blocks into alignment, and the process is repeated five more times to take the prints of the fingers of the other hand. After this is completed, card drive motor 80 is energized in such a direction as to eject the fingerprint card from the apparatus 30, and the fingerprint impression obtaining process is completed.

While the principles of the invention are thus disclosed, and the presently preferred embodiment of the invention described in detail, it is not intended that the invention be limited to this shown embodiment. Instead, many modifications will occur to those skilled in the art which lie within the spirit and scope of the invention. It is thus intended that the invention cover such modifications, and be limited in scope only by the appended claims.

What is claimed is:

1. Apparatus for taking fingerprint impressions onto a fingerprint card or the like, comprising:

a platen, means for retaining a fingerprint card on the platen, drive means for engaging the platen with the surface of a finger whose fingerprint is to be impressed upon the fingerprint card and for moving the platen in a path such that the platen contacts all portions of the surface of the finger which are to be impressed upon the fingerprint card and there is no slippage between the surface of the finger and the platen means for holding a finger in a fixed predetermined position in which the surface of the finger approximately conforms to an imaginary cylindrical surface of predetermined diameter and the drive means including means for moving the platen in an epicyclical path about the imaginary cylindrical surface, and said drive means comprising a circular member which is coaxial with and equal in diameter to the imaginary cylindrical surface and means for rolling the platen around the perimeter of the circular member with no slippage between the perimeter of the circular member and the platen.

2. The apparatus of claim 1 in which the circular member is a toothed gear member and in which the platen includes a mating rack which engages the gear member.

3. The apparatus of claim 2 in which further comprises:

a fixed support member, means for mounting the gear member on the fixed support member, a rotatable support member, means for mounting the rotatable support member on the fixed support member for rotation coaxially around the gear member, and platen support means secured to the rotatable support member for supporting the platen with its rack in engagement with the gear member.

4. The apparatus of claim 3 in which the platen support means includes first and second roller members mounted on opposed, symmetrical portions relative to the gear member which support the platen on its side beneath its rack and which, with the gear member, form a three point suspension system for the platen.

5. The apparatus of claim 4 which further includes means for rotating the rotatable support member relative to the gear member, whereby the platen support means drives the rack around the perimeter of the gear member and the platen is moved in an epicyclical path about the imaginary cylindrical surface.

6. The apparatus of claim 3 which further includes controllable means for rotating the gear member, whereby the platen can be driven to a plurality of predetermined positions relative to the means for holding the finger.

7. The apparatus of claim 3 which further includes motor means mounted on the rotatable support member for positioning a fingerprint card relative to the platen.

8. The apparatus of claim 3 which further includes means for raising and lowering the platen to bring it into and out of engagement with the surface of the finger.

9. The apparatus of claim 8 which further includes means supported from the rotatable support member for holding the finger firmly against the platen when the platen is raised into engagement with the surface of the finger.

10. The apparatus of claim 3 in which the platen includes an inking pad section for inking the finger prior to the fingerprint being impressed on the fingerprint card.

* * * * *